(12) United States Patent
Odate et al.

(10) Patent No.: US 8,165,758 B2
(45) Date of Patent: *Apr. 24, 2012

(54) VEHICULAR SEATBELT APPARATUS

(75) Inventors: Shotaro Odate, Wako (JP); Yoshitaka Suzuki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 863 days.

This patent is subject to a terminal disclaimer.

(21) Appl. No.: 12/146,919

(22) Filed: Jun. 26, 2008

(65) Prior Publication Data

US 2009/0005937 A1  Jan. 1, 2009

(30) Foreign Application Priority Data

Jun. 26, 2007  (JP) ................................ 2007-167561

(51) Int. Cl.
    *B60R 22/343* (2006.01)
(52) U.S. Cl. .... 701/45; 180/268; 242/390.1; 242/390.9; 280/806; 280/807; 297/475; 297/480
(58) Field of Classification Search .................. 180/268, 180/281, 286; 242/374, 390.1, 390.8, 390.9; 280/801.1, 806.807; 297/468, 474–480; 701/45–47

See application file for complete search history.

(56) References Cited

U.S. PATENT DOCUMENTS

| 4,666,097 | A | * | 5/1987 | Tsuge et al. | 242/390.1 |
| 4,714,274 | A | * | 12/1987 | Nagashima | 280/801.1 |
| 5,552,986 | A | * | 9/1996 | Omura et al. | 701/45 |
| 5,558,370 | A | * | 9/1996 | Behr | 280/806 |
| 6,332,629 | B1 | * | 12/2001 | Midorikawa et al. | 280/806 |
| 6,626,463 | B1 | * | 9/2003 | Arima et al. | 280/806 |
| 6,676,056 | B2 | * | 1/2004 | Peter | 242/374 |
| 7,128,343 | B2 | * | 10/2006 | Ingemarsson | 280/805 |
| 7,374,206 | B2 | * | 5/2008 | Nomura | 280/807 |
| 7,481,460 | B2 | * | 1/2009 | Odate | 280/806 |
| 7,641,237 | B2 | * | 1/2010 | Odate | 280/807 |
| 7,664,585 | B2 | * | 2/2010 | Odate | 701/45 |
| 7,686,118 | B2 | * | 3/2010 | Akaba et al. | 180/268 |
| 7,698,038 | B2 | * | 4/2010 | Odate | 701/45 |
| 7,868,572 | B2 | * | 1/2011 | Odate | 318/400.38 |
| 7,992,669 | B2 | * | 8/2011 | Odate et al. | 180/268 |
| 2008/0173748 | A1 | * | 7/2008 | Odate et al. | 242/390.9 |
| 2008/0319617 | A1 | * | 12/2008 | Takemura | 701/45 |
| 2009/0024283 | A1 | * | 1/2009 | Odate et al. | 701/45 |
| 2009/0173816 | A1 | * | 7/2009 | Odate | 242/374 |
| 2010/0057303 | A1 | * | 3/2010 | Odate | 701/45 |

FOREIGN PATENT DOCUMENTS

| JP | 09-272401 | 10/1997 |
| JP | 2004-168242 | 6/2004 |
| JP | 2006-143154 | 6/2006 |
| JP | 2006-218984 | 8/2006 |
| JP | 2007-001423 | 1/2007 |
| JP | 2007-083883 | 4/2007 |
| WO | 9630235 | 10/1996 |

* cited by examiner

*Primary Examiner* — Paul N. Dickson
*Assistant Examiner* — Laura Freedman
(74) *Attorney, Agent, or Firm* — Rankin, Hill & Clark LLP

(57) ABSTRACT

A seatbelt apparatus for a vehicle includes a control device for controlling an amount of electric current fed to a motor for winding a seatbelt. The control device controls the motor such that a predetermined amount of electric current is applied to the motor in a behavioral state of the vehicle requiring emergency measures, and such that when the seatbelt is wound a predetermined amount, the predetermined amount of winding is maintained.

3 Claims, 7 Drawing Sheets

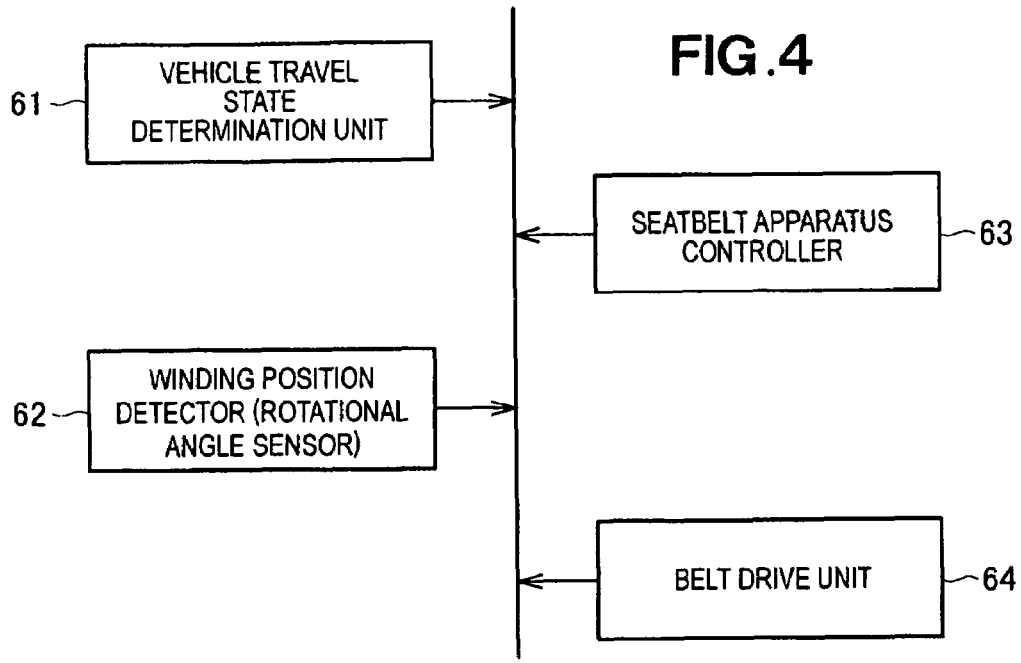
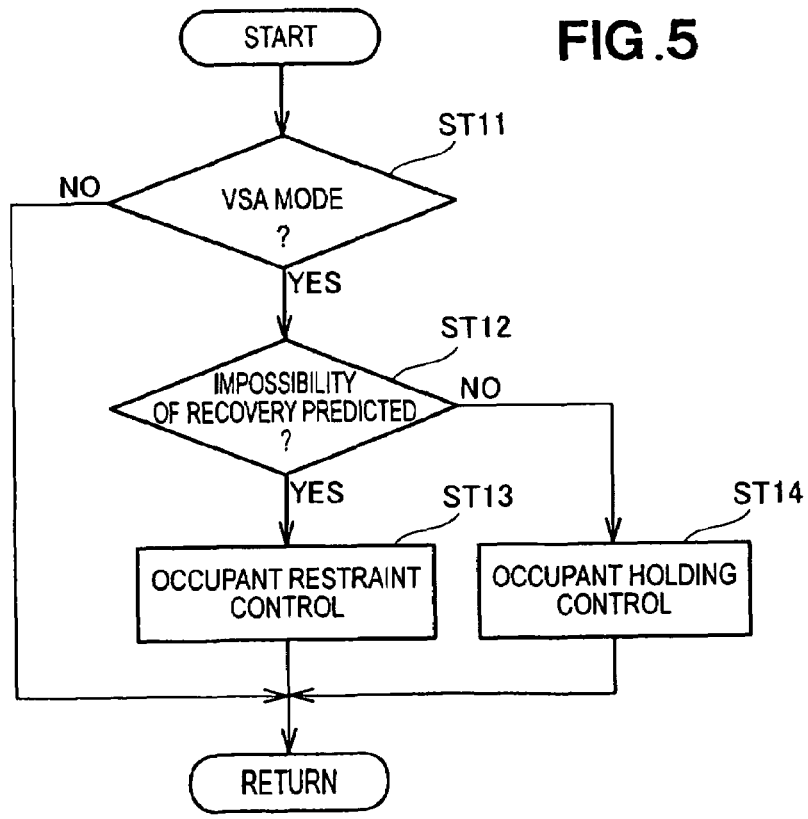

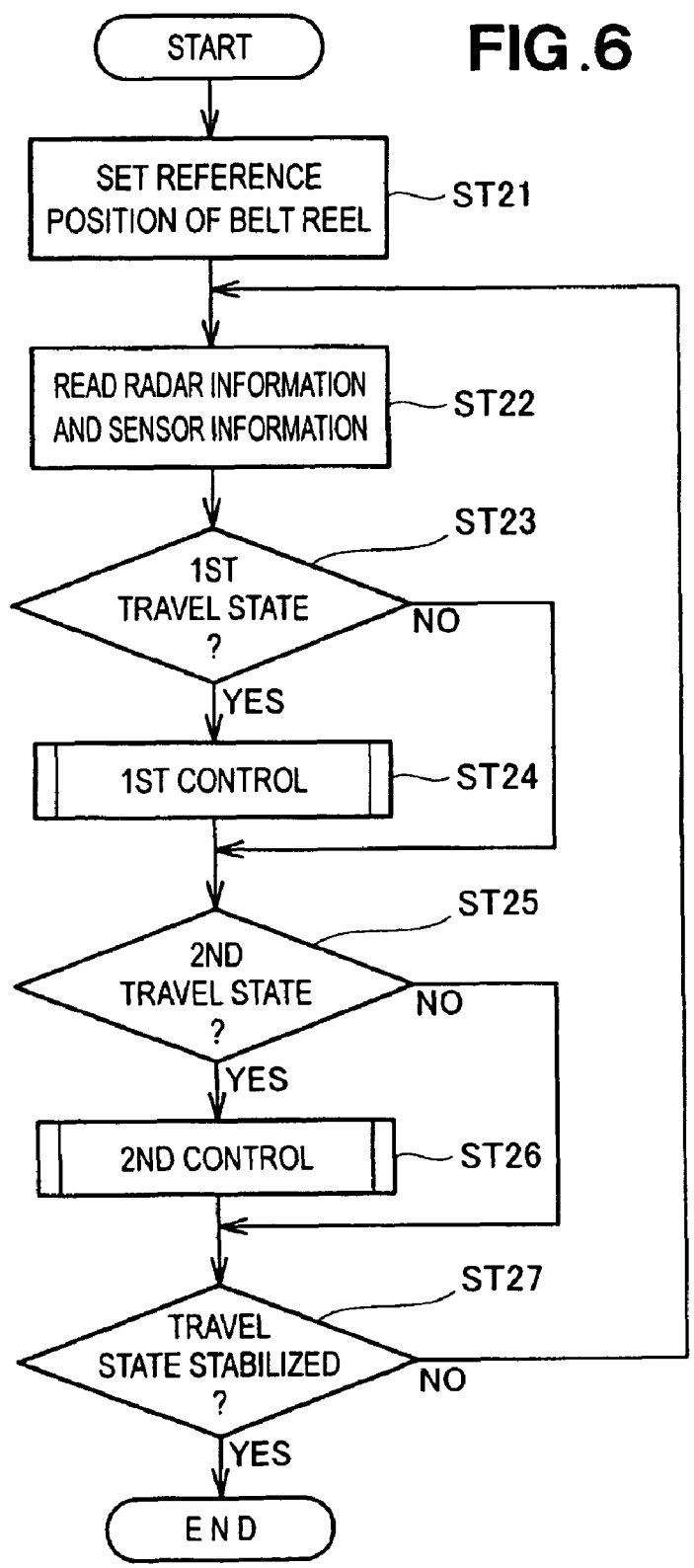

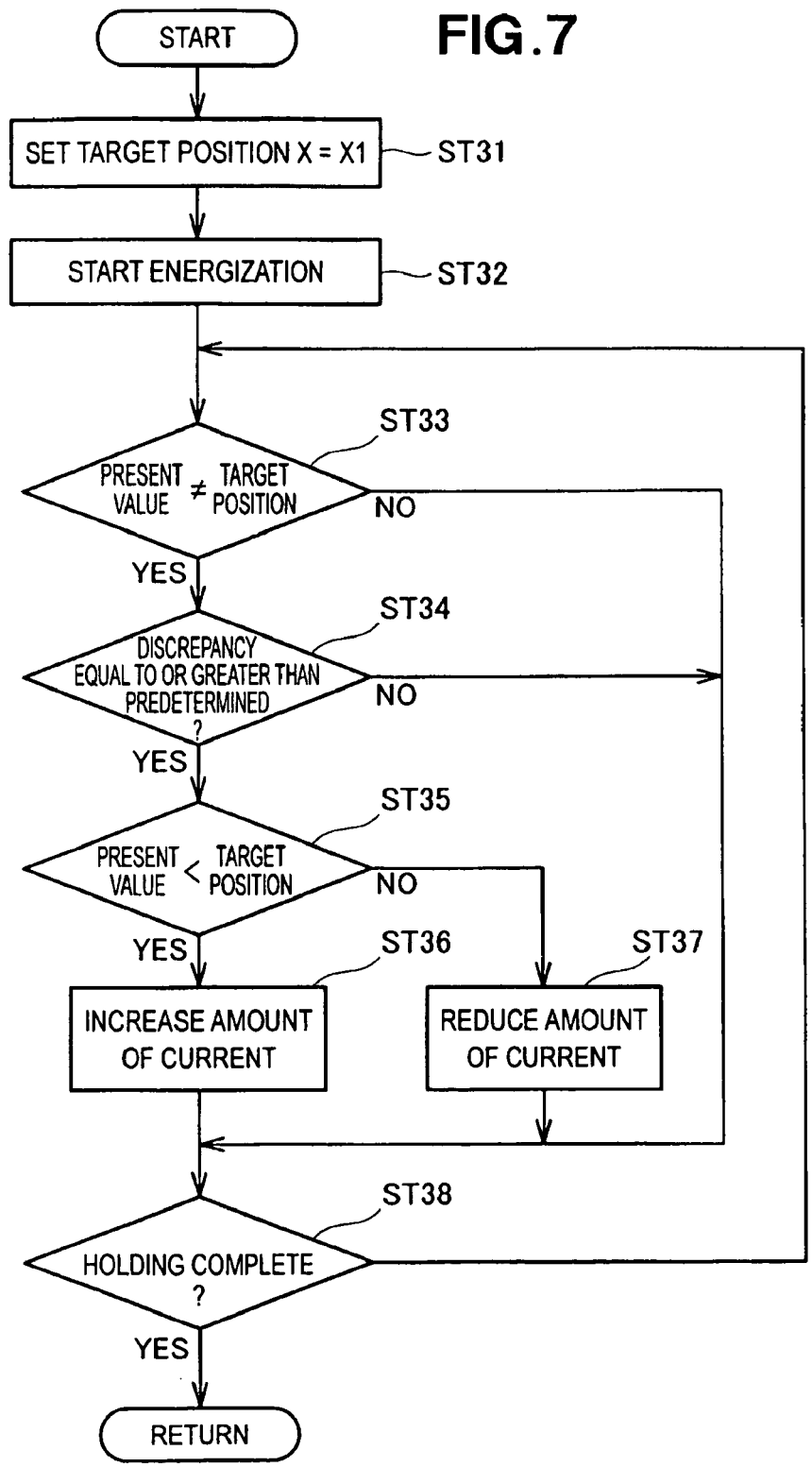

AMOUNT OF SEATBELT RETRACTION
DURING VSA CONTINUOUS OPERATION

VEHICULAR SEATBELT APPARATUS

FIELD OF THE INVENTION

The present invention relates to a seatbelt apparatus for a vehicle and, more particularly, to a vehicular seatbelt apparatus which reduces an excessive increase in tension as the belt is wound at a relatively high-speed, e.g., upon emergency restraint by the belt during travel of the vehicle.

BACKGROUND OF THE INVENTION

For a seatbelt apparatus equipped to protect a vehicle occupant seated in a seat of a vehicle, techniques have been implemented in recent years in which any change in the riding posture of the vehicle occupant is reduced by rapidly restraining the occupant with a belt or webbing in an emergency, when there is instability in the travel state of the vehicle (abnormal operation), or the like.

The restrain control apparatus for a vehicle occupant disclosed in Japanese Patent Application Laid-Open Publication No. 2007-001423 (2007-001423 A) is an example of the prior art related to a seatbelt apparatus for a vehicle. In this apparatus for controlling the restraint on a vehicle occupant, the state of the vehicle requested by the driver of the vehicle is estimated based on a detection result of detection means for detecting the travel state of the vehicle, such as a wheel speed sensor, a longitudinal acceleration sensor, and a lateral acceleration sensor; the sideslip state quantity of the vehicle, which expresses the difference between the estimated state of the vehicle and the current state of the vehicle, is calculated; the frequency of the vehicle sideslip and the average value of the amount of sideslip are computed; and seatbelt adjustment means and operation of the side supports are controlled using the above values so as to increase the restraining force on the vehicle occupant.

In the restraint and control apparatus for a vehicle occupant disclosed in JP 2007-001423 A, the belt adjustment means in the seatbelt apparatus constantly adds up the amount of winding of the seatbelt and performs control in a case in which the frequency of sideslip increases in relation to the travel state of the vehicle, creating a danger that the occupant restrained by the belt will experience discomfort and that the operation of the vehicle will be impeded. In such a seatbelt apparatus for a vehicle, there is a need to adequately restrain the vehicle occupants in accordance with the travel state of the vehicle.

SUMMARY OF THE INVENTION

In view of the aforementioned problem, an object of the present invention, is to provide a seatbelt apparatus for a vehicle in which the amount of winding of a belt can be adequately varied according to the degree of risk when it is necessary for a vehicle occupant to be restrained with the belt depending on the travel state of the vehicle, winding above a certain level can be restricted when the belt is wound at a relatively high speed, and an excess increase in belt tension can be reduced.

According to one aspect of the present invention, there is provided a seatbelt apparatus for a vehicle, comprising: a belt reel for winding a belt; a motor for rotationally driving the belt reel; control means for controlling an amount of electric current applied to the motor; and rotational position detection means for detecting a rotational position of the belt reel. The control means comprises: means for applying a predetermined amount of electric current to the motor when the vehicle is in a predetermined travel state, and means for, when determination is made, during application of the predetermined amount of electric current, based on the rotational position detected by the rotational position detection means, that the belt reel has reached a predetermined rotational position (e.g., a position 80 mm away from the start of winding operation), applying to the motor an amount of electric current for holding the predetermined rotational position.

The above-described seatbelt apparatus may also include a vehicle travel state determination unit for determining the travel state of the vehicle; rotational position detection means (rotational angle sensor) for detecting the amount of winding (retraction) or extension of the belt, the means being attached to a retractor for winding the seatbelt; and a limiter for detecting, based on information of the vehicle travel state determination unit, whether the vehicle is, for example, in a VSA mode (vehicle stability assist mode) or another travel state, and winding the belt by supplying the motor with an amount of electric current corresponding to a predetermined restraining force. When winding of the belt to a predetermined winding position is detected, further winding is restricted and the belt is held in this position.

The vehicular seatbelt apparatus allows the belt to be continuously pulled and with constant strength to reduce driver discomfort, and to ensure that the belt is wound with a predetermined amount of winding, when an emergency situation has arisen and the belt is retracted to provide emergency restraint while the vehicle is traveling.

Furthermore, the sense of pressure during operation is reduced because belt winding in excessive of the predetermined amount that results in excessive restraint can be prevented.

Preferably, the predetermined rotational position is determined based on a travel state quantity of the vehicle. As used herein, the term "travel state quantity" refers to the slip angle, yaw rate, or the like in a VSA mode, or to the relative velocity or the like when a radar is used. In the described arrangement, the belt winding operation can be immediately converged to the predetermined position based on such travel state quantities.

According to another aspect of the present invention, there is provided a seatbelt apparatus for a vehicle, comprising: a belt reel for winding a belt; a motor for rotationally driving the belt reel; control means for controlling an amount of electric current applied to the motor; and rotational position detection means for detecting a rotational position of the belt reel. The control means comprises: means for controlling the amount of electric current applied to the motor so that the belt reel is kept in a first rotational position when a travel state quantity of the vehicle reaches a first state, means for applying a predetermined amount of electric current to the motor when the travel state quantity of the vehicle reaches a second state, and means for, when determination is made during application of the predetermined amount of electric current to the motor, based on the rotational position detected by the rotational position detection means, that the belt reel has reached a second rotational position which is closer to a winding position than the first rotational position, applying to the motor an amount of electric current for holding the second rotational position.

In the vehicular seatbelt apparatus, the term "first state" may, for example, refer to the state of a VSA mode (when a slip has occurred during a turn) or a state in which the relative distance or speed of two vehicles is at or below a predetermined level, and the term "second state" may, for example, refer to a state in which a VSA mode is in effect and in which the yaw rate or slip angle are at or above a predetermined level and a collision is inevitable. Also, the term "first rotational position" may, for example, refer to a position in which the belt is fastened, and the term "second rotational position" may, for example, refer to a position 80 mm away from the position in which of the belt is fastened.

In this arrangement, the belt is not wound unnecessarily in a low-risk situation and is continuously and rapidly wound in a high-risk situation to restrain an occupant in a predetermined position. Since only the required amount of winding is applied, the driving operations are not affected by obstruction or pressure induced by excessive restraint.

With the inventive seatbelt apparatus arranged as above, it becomes possible to restrict the belt winding at or above a certain level so as not to restrain a vehicle occupant unnecessarily, to reduce an excessive increase of belt tension acting on a vehicle occupant, to reduce unpleasant feeling due to the excessive restraint, and to maintain a degree of freedom for driving operations. The same is also true in cases in which triggers resulted from operation determinations made on the basis of the states detected by sensors on a vehicle become effective intermittently, such as a case in which in a vehicle employing an apparatus for controlling, on the basis of signals outputted from sensors on the vehicle, a sideslip of the vehicle during its travel, control of a seatbelt apparatus is performed using detection of the sideslip as a trigger, and a case in which a collision is calculated using non-contact sensors such as radars.

BRIEF DESCRIPTION OF THE DRAWINGS

Certain preferred embodiments of the present invention will be described in detail below, by way of example only, with reference to the accompanying drawings, in which:

FIG. 4 is a functional block diagram showing a partial functional configuration of the control system of the seatbelt apparatus according to the present embodiment;

FIG. 5 is a flowchart showing a typical control flow of the seatbelt apparatus according to the present embodiment;

FIG. 6 is a flowchart showing typical control of the seatbelt apparatus effecting the present embodiment;

FIG. 7 is a flowchart showing an operational sequence based on the first control;

DETAILED DESCRIPTION OF THE PREFERRED EMBODIMENTS

Figure 1:
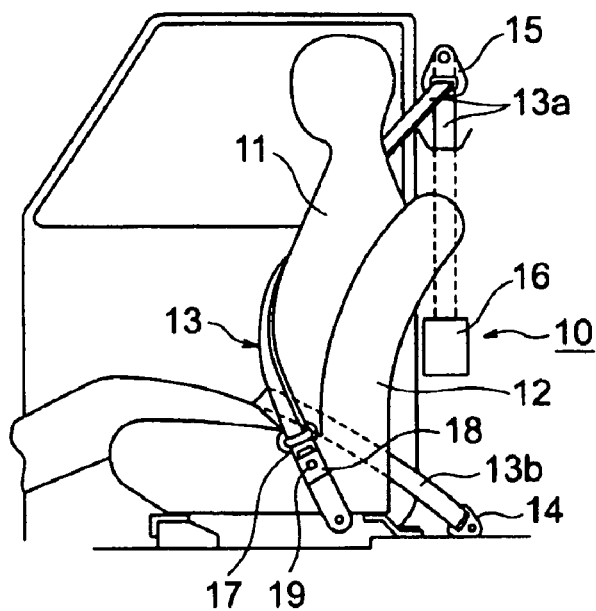
FIG. 1 is a side view showing a seatbelt apparatus in a vehicle.

As shown in FIG. 1, a seatbelt apparatus 10 has a belt (webbing) 13 for restraining the body of a vehicle occupant 11 in a seat 12. The belt 13 includes a belt section 13*a* for restricting the upper body of the vehicle occupant 11, and a belt section 13*b* for restricting the waist area of the vehicle occupant 11. One end of the belt section 13*b* is fixed to an area of the vehicle body on the floorboard of the passenger compartment by an anchor plate 14. The belt section 13*a* is turned down by a through anchor 15 provided at a location near the shoulders of the vehicle occupant 11, and an end thereof is connected with a belt reel of a retractor 16. A tongue plate 17 is installed in the other common end (folded section) of the belt 13. This tongue plate 17 can be attached to or detached from a buckle 18 fixed to the lower edge of the seat 12. A buckle switch 19 for detecting the connection of the tongue plate 17 is provided to the buckle 18.

Figure 2:
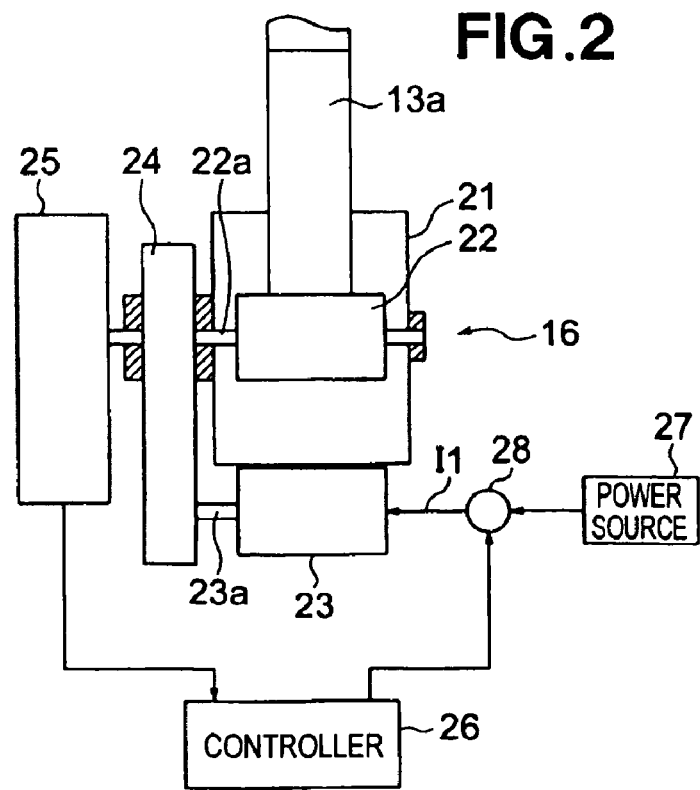
FIG. 2 is a schematic view showing a partial configuration of a retractor of the seatbelt apparatus according to an embodiment of the present invention.

As shown in FIG. 2, the retractor 16 has a belt reel (spindle) 22 rotatably disposed in a housing 21, and an electric motor 23 for rotationally driving the belt reel 22. An end of the belt section 13*a* of the belt 13 is connected to the belt reel 22, and the belt section 13*a* is wound by the belt reel 22. A shaft 22*a* of the belt reel 22 is connected to a drive shaft 23*a* of the motor 23 through a power transmission mechanism (gear mechanism) 24. The belt reel 22 is rotationally driven by the motor 23 via the power transmission mechanism 24. The retractor 16 has a winding position detector 25 connected to the shaft 22*a* of the belt reel 22.

Preferably, a rotational angle or a rotational position sensor is used to configure the winding position detector 25. For example, a magnetic sensor obtained by combining a magnetic disk and two Hall ICs may be used as the rotational angle sensor. The minimum angular resolution of the rotational angle sensor may, for example, be 4 degrees, which is about 1.3 to 1.6 mm in terms of belt length.

The belt winding operation of the retractor 16 is detected by the winding position detector 25 on the basis of information related to the belt winding position. A control device 26 controls the rotational operation of the belt reel 22 based on the detection information of the belt winding position detected by the winding position detector 25.

In the control device 26, the amount in which drive current I1 is supplied (current supply) from a power supply 27 to the motor 23 is controlled by an electric current adjustor 28, whereby the belt winding operation or the like of the retractor 16 is controlled. The retractor 16 controlled by the control device 26 is configured as an electrical pretensioner mechanism for maintaining the riding posture of the vehicle occupant 11.

As described above, detection signals (pulse signals) outputted from the winding position detector 25 are inputted to the control device 26, and the necessary processing is carried out in the control device 26 in order to ultimately extract the belt winding position and other data by using these signals.

The operation of the retractor 16 is controlled by the various control functions of the control device 26. The control device 26 retracts (winds), extends, or performs other actions on the belt of the retractor 16 by using the electric current adjustor 28 to control the amount in which the drive current I1 is fed from the power supply 27 to the motor 23.

The vehicle occupant 11 riding in the seat 12 is protected or restrained by the belt 13, is prevented from changing his posture or position, and is kept in a desirable stable state when there is an emergency and instability in the travel state of the vehicle.

The thus-configured seatbelt apparatus 10, retractor 16, and the like were driver-side devices, but the same seatbelt apparatus, retractor, and the like may also be provided on the passenger side. In the following, the "R side" is the driver side, and the "L side" is the passenger side.

Next, a control system for a seatbelt apparatus 10 or the like will be explained from a hardware standpoint with reference to the block diagram in FIG. 3.

Figure 3:
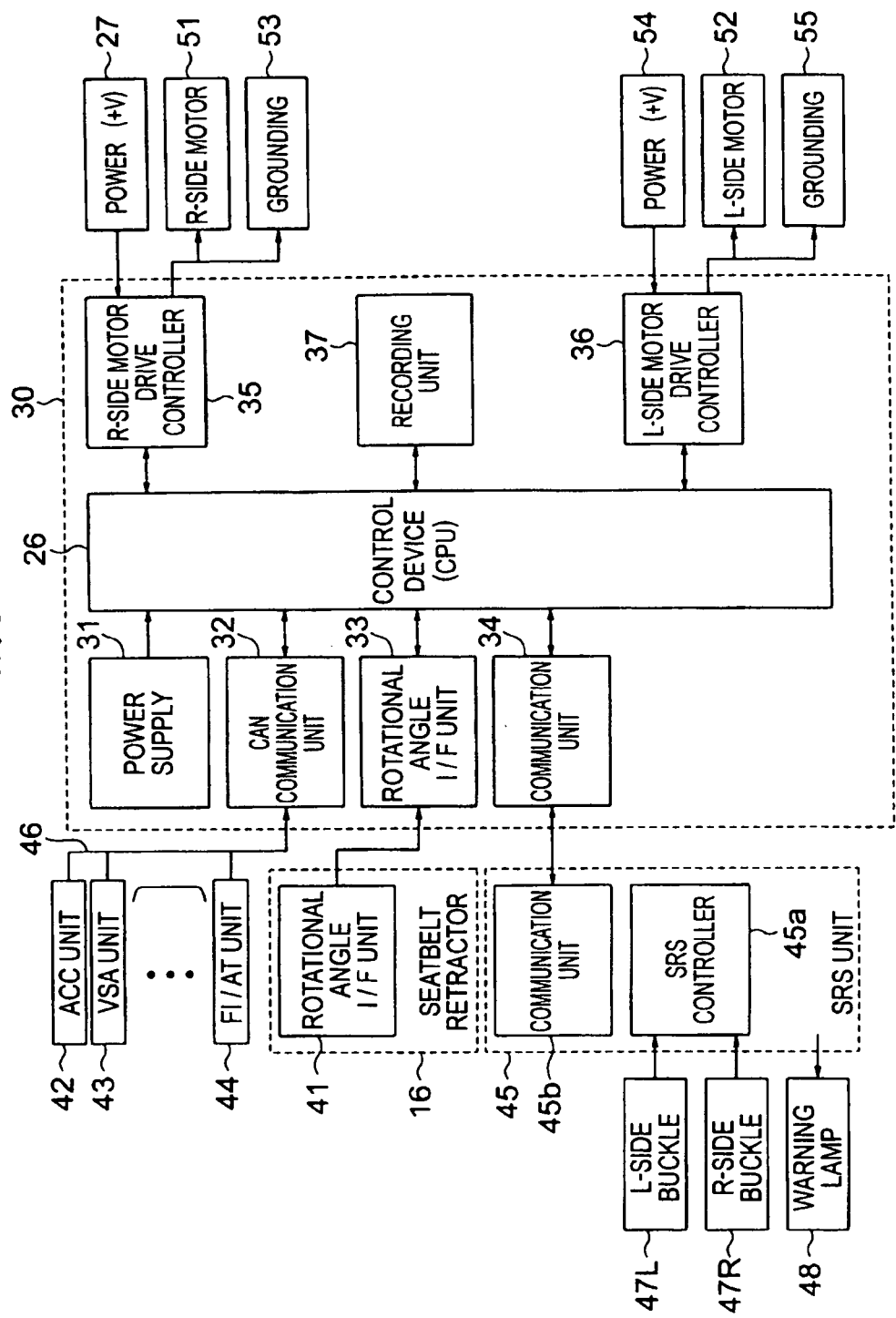
FIG. 3 is a block diagram showing the complete configuration of a control system of the seatbelt apparatus according to the present embodiment.

As shown in FIG. 3, the control device 26 comprises a CPU. A block 30, which includes the control device 26, shows an electrical pretensioner unit for maintaining the riding posture of a vehicle occupant 11 by using a seatbelt. The block 30 has a power supply section 31, a car interior network (CAN) communication unit 32, a rotational angle interface (rotational angle I/F) unit 33, and a communication unit 34 on the input side of the control device (CPU) 26; and an R-side motor drive controller 35, a L-side motor drive controller 36, and a recording unit 37 on the output side thereof. The recording unit 37 is a storage device for storing data and a control program.

A block that shows the retractor 16 as an example of a seatbelt retractor is provided on the input side of the block 30. The retractor 16 includes a rotational angle interface (rotational angle I/F) unit 41 for transmitting a detection signal outputted from the previously described winding position detector 25 to the control device 26. The rotational angle interface unit 41 is connected to the rotational angle interface unit 33 in the block 30, and a detection signal is sent to the rotational angle interface unit 33. The retractor 16 is provided to each of the driver side, the passenger side, and the like.

An ACC (Adaptive Cruise Control) unit (obstacle detection device or another control unit) 42, a VSA (Vehicle Stability Assist) unit (vehicle stabilization control unit) 43, an FI/AT (Fuel Injection/Automatic Transmission) unit 44, an SRS (Supplement Restraint System) unit (supplement restraint device unit) 45, and the likes are provided to the input side of the block 30. The elements on the input side include a vehicle speed sensor, a vehicle body longitudinal (front-and-rear direction) acceleration sensor, a vehicle body transverse (right-and-left direction) acceleration sensor, a steering sensor, a wheel speed sensor, a roll angle sensor, a turning direction sensor, a radar device, and other detection units (vehicle travel state detectors) for detecting the travel or behavioral state of the vehicle. The ACC unit 42, VSA unit 43, FI/AT unit 44, and the like supply such output signals to the car interior network communication unit 32 through a car interior network 46. The SRS unit 45 has an SRS controller 45a for receiving signals from an R-side buckle 47R and an L-side buckle 47L, and a communication unit 45b. The R-side buckle 47R corresponds to the buckle 17 on the driver side, and the L-side buckle 47L is the buckle of the seatbelt apparatus provided on the passenger side. Signals outputted from the R-side buckle 47R and the L-side buckle 47L are detection signals of a built-in buckle switch. The SRS controller 45a receives signals from the R-side buckle 47R or the L-side buckle 47L, whereupon the signals are sent to the communication unit 32 of the block 30 via the communication unit 45b. In addition, the SRS unit 45 supplies an alarm signal for a warning light 48 in a case in which a seatbelt is not being used properly while the vehicle is traveling.

An R-side motor 51 and an L-side motor 52 are provided to the output side of the block 30. The R-side motor 51 is a motor for driving the seatbelt apparatus of the driver side, and is installed corresponding to an R-side motor drive controller 35. The R-side motor drive controller 35 controls the amount of electric current fed from the power supply (+V) 27 based on a control instruction signal from the control device 26 and supplies the driving current to the R-side motor 51. A block 53 is a grounding unit. The L-side motor 52 is a motor for driving the seatbelt apparatus of the passenger seat, and is installed corresponding to an L-side motor drive controller 36. The L-side motor drive controller 36 controls the amount of electric current fed from the power supply (+V) 54 based on a control instruction signal from the control device 26 and supplies the driving current to the L-side motor 52. A block 55 is a grounding unit. The grounding units 53 and 55 are grounding terminals that constitute part of the vehicle body.

FIG. 4 is a functional block diagram schematically showing the configuration of a basic function unit of the control system of a seatbelt apparatus 10 according to the present embodiment. This control system has, as main elements, a vehicle travel state determination unit 61, the winding position detector (rotational angle sensor) 62, a seatbelt apparatus controller 63, and a belt drive unit 64.

The vehicle travel state determination unit 61 is implemented as a processing function of the control device (CPU) 26, and the travel state of the vehicle in question is determined by comparing a detection signal supplied from the vehicle travel state detector with a reference value provided in advance.

The seatbelt apparatus controller 63 has a restraint control function (restraint control for evading danger in an emergency or the like) for the normal protection of a vehicle occupant as an electrical pretensioner, a function for occupant retention control to minimize changes in the riding posture of the vehicle occupant in the seat when the posture changes in accordance with the travel state of the vehicle, a storage control function for storing the belt in the original position (storage position in which the seatbelt is completely stored) after the seatbelt mounting is released, a function for detecting the latched state when controlling the storage, and the like. The seatbelt apparatus controller 63 is composed of the R-side motor drive controller 35 and the L-side motor drive controller 36, as well as the processing functions of the control device (CPU) 26.

The belt drive unit 64 corresponds to the above-mentioned retractor 16, and, more specifically, is composed of the above-mentioned R-side motor 51 and the L-side motor 52.

Next, a characteristic operation control example of the seatbelt apparatus 10 implemented using the seatbelt apparatus controller 63 and the like will be explained based on the flowchart shown in FIGS. 5 through 8. The R-side motor 51 will be used in this example.

Normally, in order to drive a vehicle (the vehicle in question), a vehicle occupant 11 is seated in the seat 12, the belt 13 is wrapped around the occupant's body, and the tongue plate 17 is connected to the buckle 18 (R-side buckle 47R), whereupon the belt 13 is attached to the body of the vehicle occupant 11. The buckle switch 19 is turned on or otherwise activated at this time, and the buckled state of the belt is detected. Conversely, when the vehicle has arrived at the destination and the vehicle occupant 11 seated in the seat 12 removes the tongue plate 17 from the buckle 18, the buckle switch 19 is turned off or otherwise deactivated, and an unbuckled state of the belt is detected.

When the vehicle is traveling in a state in which the belt 13 is attached to the vehicle occupant 11, various travel states of the vehicle are detected by the vehicle travel state detector, and the vehicle travel state determination unit 61 determines the travel state of the vehicle based on a detection signal outputted by the vehicle travel state detector. In the process, the previously mentioned VSA unit (vehicle stability assist unit) 43 operates to stabilize the behavior of the traveling vehicle in a case in which the travel state of the vehicle diverges from a normal state used as a reference.

The flowchart in FIG. 5 shows a basic operation control example of the seatbelt apparatus 10 according to the present embodiment.

In the flowchart of FIG. 5, the control device 26 of the seatbelt apparatus 10, more specifically, the seatbelt apparatus controller 63, determines whether the VSA unit 43 operates in the initial determination step S11. If the unit does not operate, no control is performed, and the control flow is completed. If the VSA unit 43 operates, the process proceeds to the next determination step S12. In the next determination step S12, a determination is made as to whether there is a prediction that a recovery is impossible. As used herein, the phrase "state in which a recovery is impossible" refers to a state prior to a transition to a spinning state when the vehicle undergoes such a transition. In such a case, a determination of YES is made in the determination step S12, and the process of occupant restraint control is carried out (step S13). In a case in which a state in which a recovery is impossible is predicted, it is likely that it will be impossible to wind the seatbelt after a spinning state is established, as in the previously mentioned example. Therefore, a configuration is used in which occupant restraint control is performed at a stage before the prediction is made. In a case in which a determination of NO is made in the determination step S12, the process of occupant holding control is carried out (step S14). In this case, because a recovery is possible, the normal occupant holding control for maintaining the riding posture of the vehicle occupant is carried out.

The control flow is completed after the process of occupant restraint control or occupant holding control is carried out.

The flowchart in FIG. 6 shows a characteristic operation example of a seatbelt 10 according to the present embodiment. In this operation control example, a position that serves as a reference (reference position) is initially set for the belt winding position of the belt reel 22 (step S21), and radar information and information from other sensors, that is, detection information from the vehicle travel state detectors (step S22) is then received. The vehicle travel state determination unit 61 determines the travel state of the vehicle based on the information related to various vehicle travel states obtained from the vehicle travel state detectors. A determination is made herein whether the vehicle is in the first travel state (determination step S23) or second travel state (determination step S25). When the determination indicates the first travel state, the routine processing step S24 of the "first control" is carried out. When the determination indicates the second travel state, the routine processing step S26 of the "second control" is carried out. In the above, steps S23 and S24 related to the first travel state and control are carried out first, and steps S25 and S26 related to the second travel state and control are carried out afterwards. In the final determination step S27, a determination is made as to whether the vehicle is traveling. If a determination of NO is made in the determination step S27, the process returns to the abovementioned step S22, and if the determination is YES, the control flow is completed.

Figure 8:
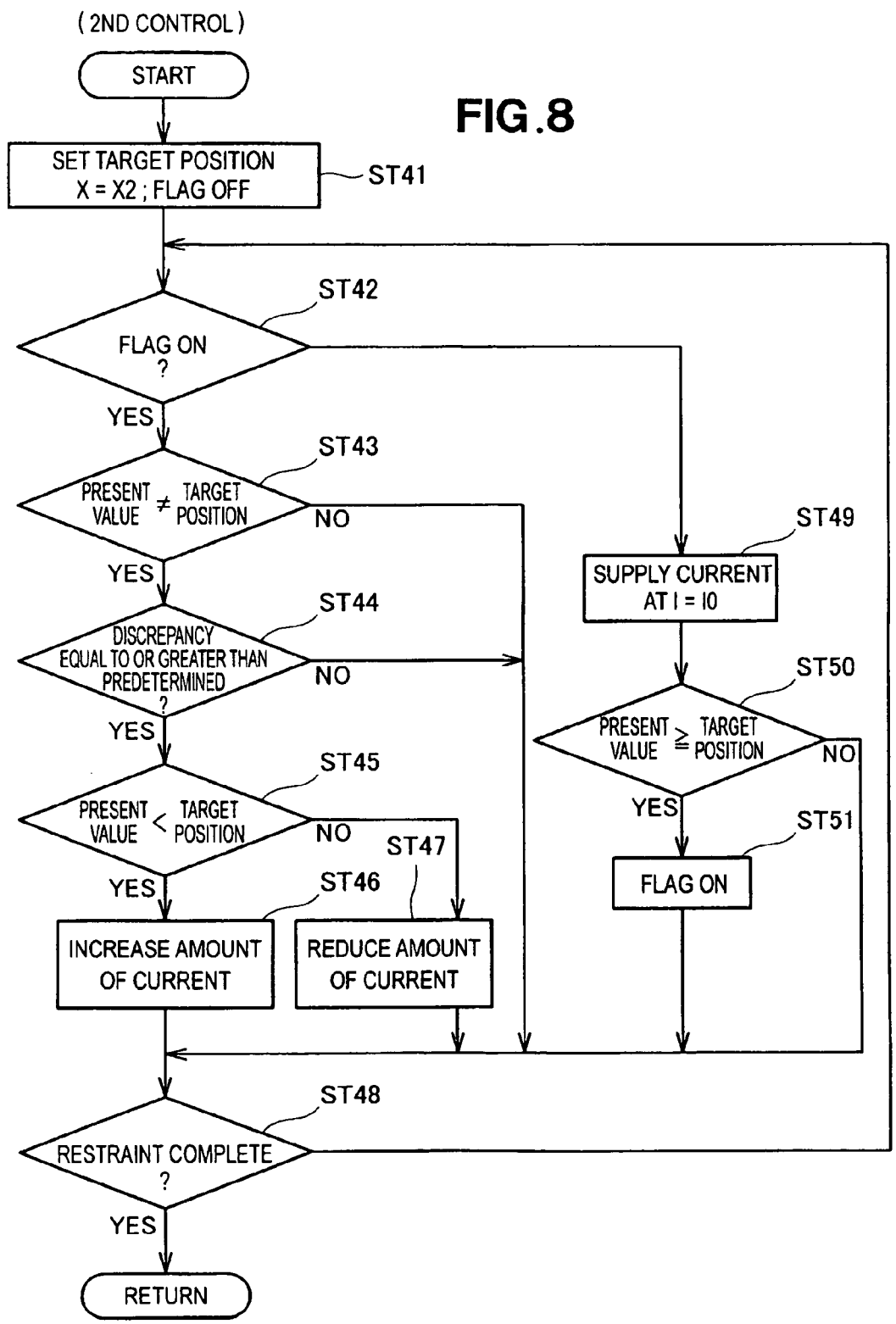
FIG. 8 is a flowchart showing an operational sequence based on the second control.

The contents of the routine process of the "first control" are shown in FIG. 7, and the contents of the routine process of the "second control" are shown in FIG. 8. The contents of the routine process of the "first control" shown in FIG. 7 are the contents of the "occupant holding control," and the contents of the routine process of the "second control" shown in FIG. 8 are the contents of the "occupant restraint control."

In the flowchart of FIG. 7, a target position (X) that corresponds to a preset seatbelt holding state is set (X=X1) in correspondence with a change in the travel state of the vehicle in the initial processing step S31. When the target position is set in step S31, a motor holding electric current for controlling the winding operation of the R-side motor 51 or the like is determined so that a correspondence with the target position is achieved. In the next step S32, energization, namely, control of the holding electric current for changing the amount of winding of the belt 13 by the R-side motor 51 is started.

As a basic operation example of the seatbelt apparatus 10, the R-side motor 51 is driven by the necessary amount of electric current, the belt reel 22 is caused to wind the belt section 13a of the belt 13, and the belt section 13a is retracted into the retractor 16. The amount of winding of the belt 13 is set at the desired target position by maintaining the necessary amount of electric current flowing through the R-side motor 51 or the like as the holding electric current.

More specifically, the holding electric current for setting the belt 13 at the target position is controlled so that the holding control is continued according to steps S33 to S38 as shown in FIG. 7 until the present value, which is determined by the holding electric as the object of control, matches the target position in a stabilized state. In other words, when the present value does not match the target position in the determination step S33, a determination is made in the next determination step S34 as to whether or not the difference (discrepancy) between the two is equal to or greater than a predetermined difference. The process proceeds to the determination step S35 in the case of a YES in the determination step S34. The process proceeds to the determination step S38 in the case of a NO in the determination step S34.

In the determination step S35, the comparative relationship between the present value and the target position is determined. The amount of electric current applied to the motor is increased (step S36) in a case in which the present value is smaller than the target position, and the amount of electric current applied to the motor is reduced in a case in which the present value is larger than the target value (step S37).

A determination is then made as to whether the holding control has been completed (determination step S38). In a case in which the holding control has not been completed, the process returns to step S33 and the above-mentioned steps S33 through S38 are repeated. While the holding control is being carried out, the present value and the target position are controlled so as to match each other.

When the target position and the present value are brought into agreement with each other in determination step S33, the process proceeds to determination step S38 immediately.

Next, in the flowchart of FIG. 8, a target position (X) that corresponds to a preset seatbelt holding state is set (X=X2) in correspondence with a change in the travel state of the vehicle in the initial processing step S41, and a flag is set to OFF. When the target position is set in step S41 and the flag is set to OFF, a determination is made as to whether the flag is ON in the next step S42. In this case, the flag is determined to be OFF and the process proceeds to step S49.

If the determination is that the flag is OFF in step S42, a motor current based on I=10 is supplied (step S49). The amount of electric current supplied to the motor corresponds to a restraining force based on the motor torque in the occupant restraint control by the seatbelt apparatus 10. In other words, by winding the belt 13 with a predetermined restraining force, it is possible to securely wind the belt 13 in accordance with the degree of risk.

In the next step S50, the comparative relationship between the present value and the target position is determined, and the process proceeds to step S48 in a state where the process (step S51) of flag ON is continued if the present value is equal to or greater than the target position. Otherwise the process proceeds directly to step S48 without any action being taken.

The flowchart of FIG. 8 shows a configuration where steps S49 through S51 shown in FIG. 8 are carried out immediately following the start of the flow of electric current (not shown) for winding the belt 13, and is one in which the flow of steps S42 through S47 is thereby carried out after the target position is reached (YES in step S50).

If the outcome in step S50 is YES, the flag is ON (step S51), a YES is determined to be the outcome in the next step S42, and the process subsequently proceeds to step S43.

When the target position (X2) is set in step S41, a motor holding electric current for controlling the winding operation of the R-side motor 51 or the like is determined so that a correspondence with the target position is achieved, and control of the holding electric current for changing the amount of winding of the belt by the R-side motor 51 is continued.

The holding electric current for setting the belt 13 at the target position is controlled so that the restraint control is continued according to steps S43 through S48 in the same manner as in the example in FIG. 7 until the present value determined by the holding electric current, which is the object of the restraint control, matches the target position in a stabilized state. In other words, when the present value does not match the target position in the determination step S43, a determination is made in the next determination step S44 as to whether or not the difference (discrepancy) between the two is equal to or greater than a predetermined difference. The process proceeds to determination step S45 in the case of a YES in the determination step S44. The process proceeds to the determination step S48 in the case of a NO in the determination step S44.

In the determination step S45, the comparative relationship between the present value and the target position is determined. The amount of electric current supplied to the motor is increased (step S46) in a case in which the present value is smaller than the target position, and the amount of electric current fed to the motor is reduced in a case in which the present value is larger than the target value (step S47).

A determination is then made as to whether the restraint control had completed (determination step S48). In a case in which the restraint control has not been completed, the process returns to step S42 and the above-mentioned steps S42 through S48 are repeated. While the restraint control is being carried out, the present value and the target position are controlled so as to match each other.

When the target position and the present value are brought into agreement with each other in determination step S43, the process proceeds to determination step S48 immediately.

Figure 9:
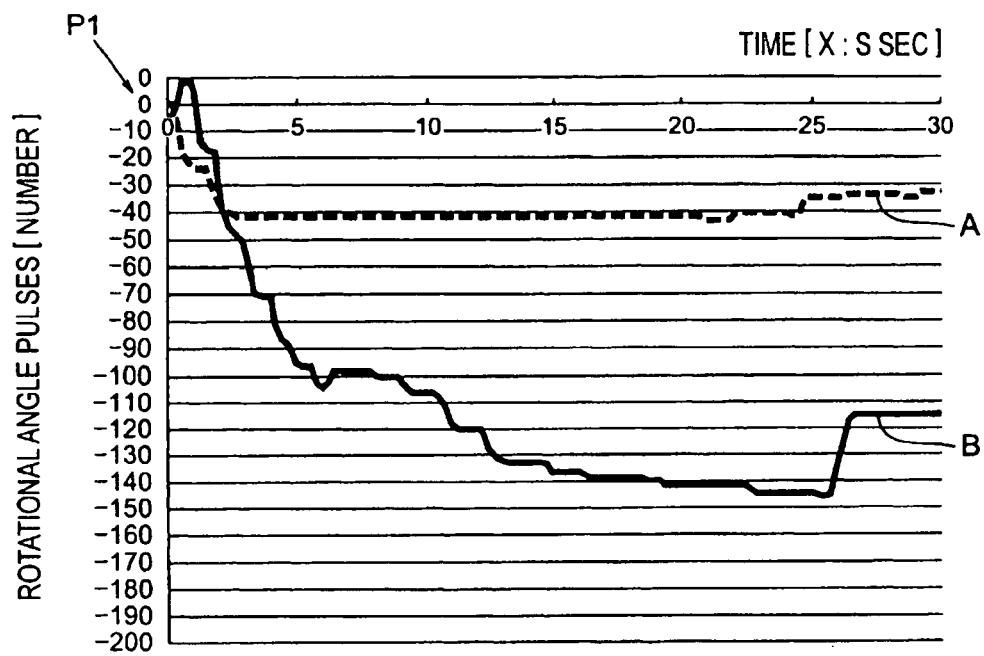
FIG. 9 is a graph showing the change characteristics of the amount of retraction of a seatbelt during a continuous VSA mode based on the control of the present embodiment.

FIG. 9 shows the characteristics of the occupant restraint control based on the aforementioned second control. In FIG. 9, the number of rotation angle pulses (number) is plotted on the right-side vertical axis, and the time in hours (seconds) is plotted on the horizontal axis. FIG. 9 shows two graphs, A and B, for the amount by which the seatbelt is retracted at the time of a continuous VSA operation. Point P1 in FIG. 9 shows a normal seated position. Graph A shows the characteristics of occupant restraint control based on the aforementioned second control according to the present embodiment, and the control characteristics are shown for a case of limiter control. Graph B shows control characteristics for a case of no limiter control.

The structures, shapes, dimensions, and placement relationships described in relation to the above embodiments are merely shown in schematic form to the degree that the present may be understood and carried out. Accordingly, the present invention is not limited to the above-described embodiments, and may be modified in a variety of ways as long as the scope of the technical ideas described in the claims is not exceeded.

The present invention may be used to reduce the feeling of discomfort caused by excessive restraint and to ensure that a seatbelt apparatus for a vehicle provides a degree of freedom for the diving operations.

Obviously, various minor changes and modifications of the present invention are possible in light of the above teaching. It is therefore to be understood that within the scope of the appended claims the invention may be practiced otherwise than as specifically described.

What is claimed is:

1. A seatbelt apparatus for a vehicle, comprising;
  a belt reel for winding a belt;
  a motor for rotationally driving the belt reel;
  a controller configured to control an amount of electric current applied to the motor; and
  a rotational position detector for detecting a rotational position of the belt reel,
  wherein the controller comprises:
  a device configured to apply a predetermined amount of electric current to the motor when the vehicle is in a predetermined travel state, and
  wherein during application of the predetermined amount of electric current to the motor, when a determination is made based on the rotational position detected by the rotational position detector that the belt reel has reached a predetermined rotational position, the device is configured to apply to the motor an amount of electric current for holding the predetermined rotational position.

2. The seatbelt apparatus of claim 1, wherein the predetermined rotational position of the belt reel is determined based on a travel state quantity of the vehicle,
  wherein in a first travel state the belt reel is in a first rotational position and in a second travel state, which occurs after the first travel state, the belt reel is in a second rotational position.

3. A seatbelt apparatus for a vehicle, comprising:
  a belt reel for winding a belt;
  a motor for rotationally driving the belt reel;
  a controller configured to control an amount of electric current applied to the motor; and
  a rotational position detector configured to detect a rotational position of the belt reel;
  wherein the controller comprises:
  a device configured to control the amount of electric current applied to the motor so that the belt reel is kept in a first rotational position when a travel state quantity of the vehicle reaches a first state,
  the device configured to apply a predetermined amount of electric current to the motor when the travel state quantity of the vehicle reaches a second state after reaching the first state, and
  wherein during application of the predetermined amount of electric current to the motor, when a determination is made based on the rotational position detected by the rotational position detector that the belt reel has reached a second rotational position which is closer to a winding position than the first rotational position, the device is configured to apply to the motor an amount of electric current for holding the second rotational position.

* * * * *